United States Patent [19]

Beaver et al.

[11] Patent Number: 4,912,965
[45] Date of Patent: Apr. 3, 1990

[54] RUPTURE DISC MONITOR

[75] Inventors: Phillip R. Beaver; Clifford S. Durand, III, both of Baton Rouge, La.

[73] Assignee: Ethyl Corporation, Richmond, Va.

[21] Appl. No.: 331,182

[22] Filed: Mar. 31, 1989

[51] Int. Cl.$^4$ .............................................. G01M 3/26
[52] U.S. Cl. ............................................ 73/40; 73/4 R
[58] Field of Search ..................... 137/68.1; 73/37, 40, 73/46, 4 R; 220/89.8, 89 R

[56] References Cited

U.S. PATENT DOCUMENTS

| | | | |
|---|---|---|---|
| 3,872,875 | 3/1985 | Raidl, Jr. ............................... | 73/4 R |
| 4,342,988 | 8/1982 | Thompson et al. .................. | 340/679 |
| 4,464,936 | 8/1984 | McIntire et al. ...................... | 73/705 |
| 4,840,057 | 6/1989 | Bingham .............................. | 73/4 R |

OTHER PUBLICATIONS

Product Literature from Fike Corporation.
Product Literature from BS&B Safety Systems.

*Primary Examiner*—Hezron E. Williams
*Attorney, Agent, or Firm*—Edgar E. Spielman, Jr.

[57] ABSTRACT

This invention relates to an apparatus and process for detecting gas permeability in a main rupture disc which is in gaseous communication with a vessel. The process comprises: fitting a chamber over and in gas-tight association with the outside surface of the main rupture disc; selecting a burst presure for the main rupture disc and a set pressure; obtaining a gaseous pressure within the chamber which is greater than the normal operating pressure within the vessel, and equal to the difference between the set pressure and the burst pressure of the main rupture disc; and monitoring the chamber pressure for a decrease thereof. The apparatus comprises, generally, a chamber, a means for obtaining a gaseous pressure within the chamber, and a means for monitoring a change in pressure in the chamber.

10 Claims, 2 Drawing Sheets

RUPTURE DISC MONITOR

BACKGROUND OF THE INVENTION

This invention relates to a method and apparatus for monitoring a rupture disc for gas permeability.

Vessels which may be subject to a dangerous buildup of pressure are required by the ASME Code to be protected by pressure relieving devices such as safety valves and rupture discs. These devices are designed to allow the vessel to vent upon the obtainment of a vessel pressure which is less than or equal to the vessel's maximum allowable working pressure (MAWP). The vessel pressure at which venting is to begin is commonly referred to as the set pressure. The differential pressure across a rupture disc at rupture is referred to as the burst pressure.

Safety valves and rupture discs are used by placing them in gaseous communication with the vessel's gaseous contents. This can be accomplished by fitting the devices directly to the vessel or on a line leading to the vessel.

While safety valves have many applications, the best engineering practice would not recommend them where there is a chance that the valve could become plugged, as would be the case when the vessel contains solids dissolved in or in admixture with a liquid medium. In these cases, it is preferred to use rupture discs.

Care must be taken with both safety valves and rupture discs when the vessel's contents are corrosive as the operative integrity of these devices can be compromised. Rupture discs are especially useful under corrosive conditions since the disc can be made of a material which is resistant to corrosion and since these discs are fairly easy to change-out when the disc suffers an unacceptable degree of corrosion over time. Safety valves can also be made corrosion resistant material, but should they suffer corrosion, they must be totally replaced at a high cost or must be rebuilt, which rebuilding is not without substantial expense and is time consuming.

Despite the advantages of rupture discs, they are not a panacea. It is not unusual for a rupture disc to develop a pinhole leak due to corrosion, to fatigue or to damage during installation. Such leaks are dangerous as they may compromise the rupture disc's burst pressure rating, and, when the vessel contains a toxic gas, allow for the leakage of the toxic gas into the atmosphere. The art has answered this problem by providing a device which uses a double disc system. In a typical application of this system, two identical rupture discs are mounted in series in a three-piece disc holder so that there is a chamber defined between the two discs. A pressure gauge monitors for any increase in the chamber's pressure. When the rupture disc that is in gaseous communication with the vessel gas develops a leak, the gas from the vessel fills the chamber and causes a rise in chamber pressure. Upon periodic inspection, the gauge reading is seen and the necessary repairs can be effected. While this system is useful, it can be expensive as it can require that the second disc be of a corrosion resistant material if the vessel gas is corrosive. Also, this system can result in an unintentional raising of the set pressure should a pinhole leak form in the disc closest to the vessel. The gas leaked into the chamber can achieve a pressure in the chamber which is equal to the vessel pressure. When this occurs, the set pressure becomes the sum of the vessel pressure and the burst pressure rating of the disc closes to the vessel. Such a sum can far exceed the designed set pressure which was based only upon the burst pressure of the disc.

It is therefore an object of this invention to provide a process and apparatus for safely detecting gaseous permeability in a rupture disc, and for protecting against the escapement of vessel gas into the atmosphere during normal vessel operation.

THE INVENTION

This invention relates to the process for detecting as permeability in a main rupture disc which is in gaseous communication with a vessel. The process comprises: fitting a chamber over and in gas-tight association with the outside surface of the main rupture disc which is subject to rupture; selecting a burst pressure for the main rupture disc and a set pressure; obtaining a gaseous pressure within the chamber which, is greater than the normal operating pressure within the vessel, and which is equal to the difference between the set pressure and the burst pressure of the main rupture disc; and monitoring the chamber pressure for a decrease thereof. In a preferred process of this invention the chamber is additionally provided with a chamber rupture disc which has a burst pressure which, when added to the burst pressure of the main rupture disc, provides a sum which is substantially equal to the set pressure and which will allow for obtainment of the chamber pressure without rupture of the chamber rupture disc. It is also preferred that the obtained gaseous pressure in the chamber is provided by a gas source which, after such obtainment, is isolated from the gas chamber. The process of this invention is suitable for use with vessels which are operated under sub-atmospheric, atmospheric and super-atmospheric pressures. In most applications, the vessel will be operated at super-atmospheric pressure.

This invention also relates to an apparatus for detecting gas permeability in a main rupture disc which is in gaseous communication with the vessel. The apparatus comprises: a chamber which is fittable over and in gas-tight association with the outside surface of the main rupture disc which is subject to rupture; means for obtaining, when the chamber is fitted as described above, a gaseous pressure within the chamber which, is greater than the normal operating pressure within the vessel, and which is equal to the difference between a selected set pressure and a selected burst pressure for the main rupture disc; and means for monitoring the chamber pressure for a decrease thereof. It is preferred that the chamber be in gaseous communication with a chamber rupture disc which has a burst pressure which, when added to the burst pressure of the main rupture disc provides a sum which is substantially equal to the set pressure and which allows for obtainment of the chamber pressure without rupture of the chamber rupture disc. A preferred configuration for the chamber is that one which is provided by a hollow cylinder which is closed at one of its ends by fitting the chamber with respect to the main rupture disc as described above, and which is closed at the other of its ends by a chamber rupture disc. To avoid a mistake in switching the main rupture disc for the chamber rupture disc, or vice versa, it is preferred that the two discs be configured so that they are visually different from one another and/or so that their installations are different. Since the main rupture disc will be in contact with the vessel gas, which gas may be corrosive, the main rupture disc is preferably made from a material which is resistant to corrosive attack. It is a feature of this invention that the chamber rupture disc need not be made of a corrosive material, as the chamber rupture disc should not be in contact with the vessel gas since the gas pressure within the chamber was greater than the normal vessel operating pressure and, thus, if gas permeability occurs in the main rupture disc, the chamber gas will leak into the vessel. Since the chamber rupture disc need not be made of corrosive material it may be manufactured from less expensive materials, e.g. graphite, and thus a savings can be realized. Also, since the vessel gas does not escape from the vessel when the main rupture disc becomes permeable, there is little danger of gas escaping from the vessel under normal operating conditions. This feature is important when the vessel gas is toxic.

The chamber pressure can be allowed to vary within an acceptable range. Such variance could occur as a result of a change in the temperature of the normal ambient air surrounding the outside of the chamber or from fluctuations of the temperature of the vessel or its content. For example, a selected chamber pressure of 5 psig at 20° C. may drop to 3 psig or rise to 7 psig as a result, respectively, of a temperature drop to 0° C. or a temperature rise to 40° C.

Since the sum of the chamber pressure and the burst pressure of the main rupture disc will equal the set pressure, the set pressure will change along with a variance in the chamber pressure. The amount of change is small, but this change should be considered in selecting the initial chamber pressure and the burst pressure of the main rupture disc.

When it is stated herein that the sum of the burst pressures of the main rupture disc and the chamber rupture disc is substantially equal to the set pressure it is meant that this sum is as close to the set pressure as can be practically obtained considering the expected variance in the chamber pressure and the need for the chamber rupture disc not to rupture under the highest normally expected chamber pressure. Also, the commercial unavailabity of chamber and main rupture discs having certain burst pressure ratings may require the use of a chamber and main rupture disc combination which will not exactly equal the set pressure. For example, if the minimum and maximum expected chamber pressures are 8 and 12 psig, respectively, the set pressure is 78 to 82, the main rupture disc has a burst pressure of 70 psig and chamber rupture discs are available in burst pressures of only 10 psig and 15 psig, a burst rating of 15 psig would be the choice for the chamber rupture disc even though it and the 70 psig rating of the main rupture disc will yield a sum which exceeds the maximum set pressure of 82 psig.

It is generally desirable that the chamber rupture disc have a burst pressure which is substantially less than the burst pressure of the main rupture disc. It is preferred that the chamber rupture disc have a burst pressure which is within the range of from about 1 to less than about 50 percent of the burst pressure of the main rupture disc. It is most preferred that the burst pressure of the chamber rupture disc be from about 5 to about 20 percent of the burst pressure for the main rupture disc.

The vessels which are in gaseous communication with the main rupture disc can be any of those types of vessels which are required to be or which are customarily fitted with pressure relieving devices. For example, the vessel may be a storage vessel, reactor, separation column, evaporator, crystallizer, steam boiler or pipe line.

The main rupture disc can be mounted directly to the vessel or can be mounted to a line which is in gaseous communication with the vessel gas. The points for mounting the main rupture disc are the conventional mounting points, i.e. those points which place the main rupture disc in gaseous contact with the gas in the vessel. While it is possible to locate a main rupture disc so that it is in contact with the liquid contents of a vessel, such locating is not preferred.

The selection of the main rupture disc should be such that the main rupture disc is of a material which is resistant to corrosion from the vessel contents. The chamber rupture disc and chamber need not be made of an expensive corrosion resistant material as the gas used in the chamber is preferably selected to not be corrosive. In fact, it is preferred that the gas used within the chamber be an inert gas such as nitrogen, argon or air. The gas selection should also consider that the chamber gas will enter the reactor when the main rupture disc becomes permeable to gas. With this being considered, the selected chamber gas should not create a hazard or cause undesired reactions in the vessel. Due to its inertness, relative low price and its ready availability, nitrogen is preferred.

The positive difference between the selected chamber pressure and the vessel's normal working pressure is preferably sufficiently large to allow for the utilization of conventional monitoring systems to detect the reduced pressure in the chamber should gas permeability of the main rupture disc occur. In other words, if the difference between the chamber pressure and the vessel's normal working pressure was extremely small, it would take a highly sensitive and expensive instrument to detect a drop in the chamber pressure. Also, such a small difference in pressure could cause false alarms due to changes in the chamber pressure caused by changes in the temperature of the ambient air, etc. Since process economics always favors the practical and the inexpensive, such minor differences between these two pressures are not usually used. Generally speaking, a preferred difference between the chamber pressure and the vessel's normal working pressure is within the range of from about 5 to about 200 percent of the vessel's normal working pressure. This pressure difference will provide suitable results and enable the utilization of conventional pressure monitoring devices.

The gaseous pressure obtained within the chamber can be supplied from a conventional pressurized gas cylinder or from a plant's inert gas supply. Since the supply pressure is usually fairly high, a regulator may be utilized to deliver the gas to chamber at the desired chamber pressure.

It is preferred that the gas supply be isolated from the chamber. When the gas supply is isolated from the chamber, a valve is shut in the supply line so as to effect the isolation. A pressure gauge or switch is provided in gaseous communication with the chamber to directly monitor a drop in chamber pressure due to loss of gas through a permeable main rupture disc. Other arrangements can be used, there being no criticality in the particular arrangement chosen so long as the pressure change in the chamber is monitored when permeability of the main rupture disc occurs.

For the purpose of describing the process and apparatus of this invention, all references to pressure or to be taken as psig.

The foregoing and other features of this invention contributing to satisfaction in use and economy in manufacture will be more fully understood from the following description of a preferred embodiment and the accompanying drawings in which identical numerals refer to identical parts and in which.

Figure 1:
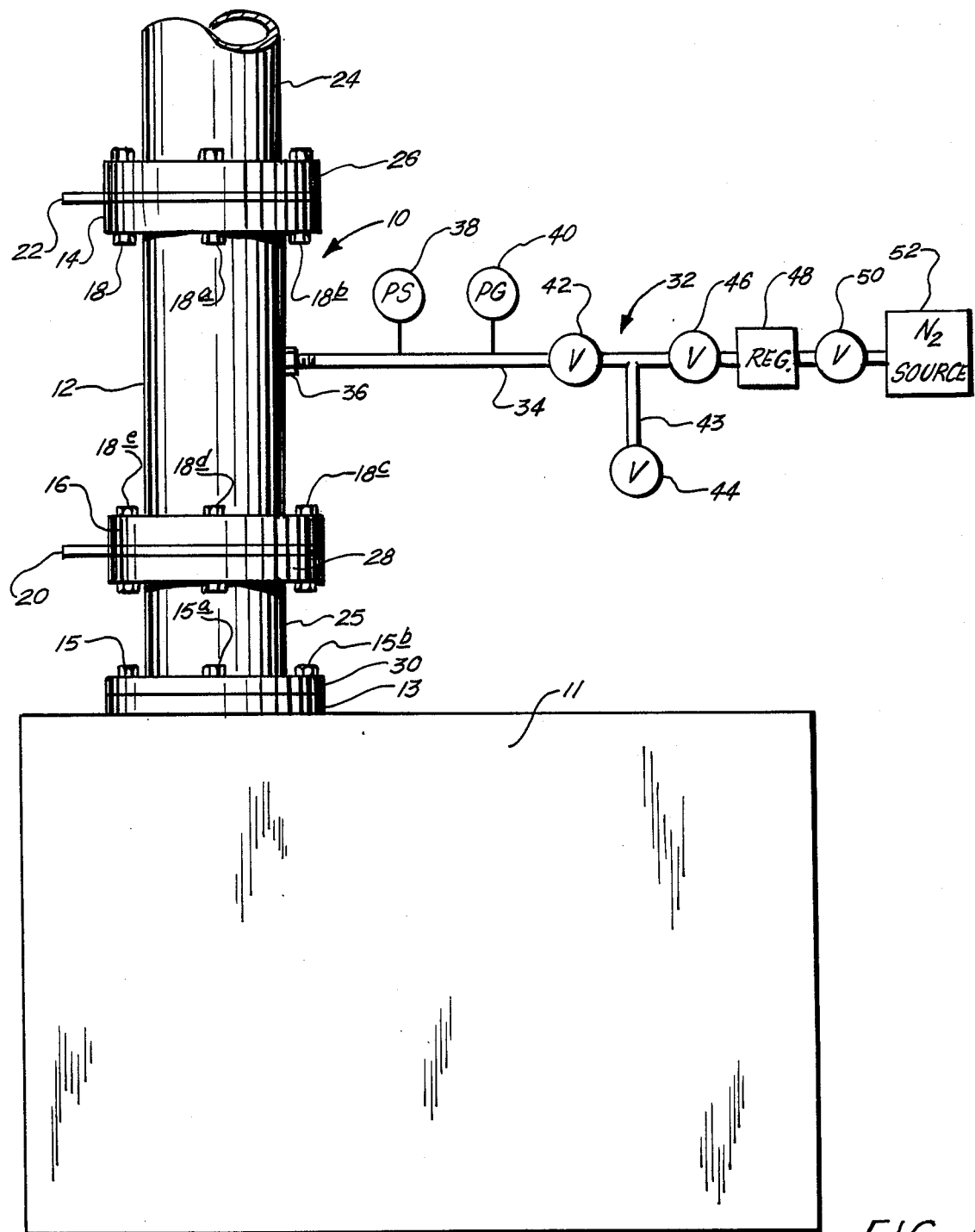
FIG. 1 is a side elevational view of an apparatus of this invention.
Figure 2:
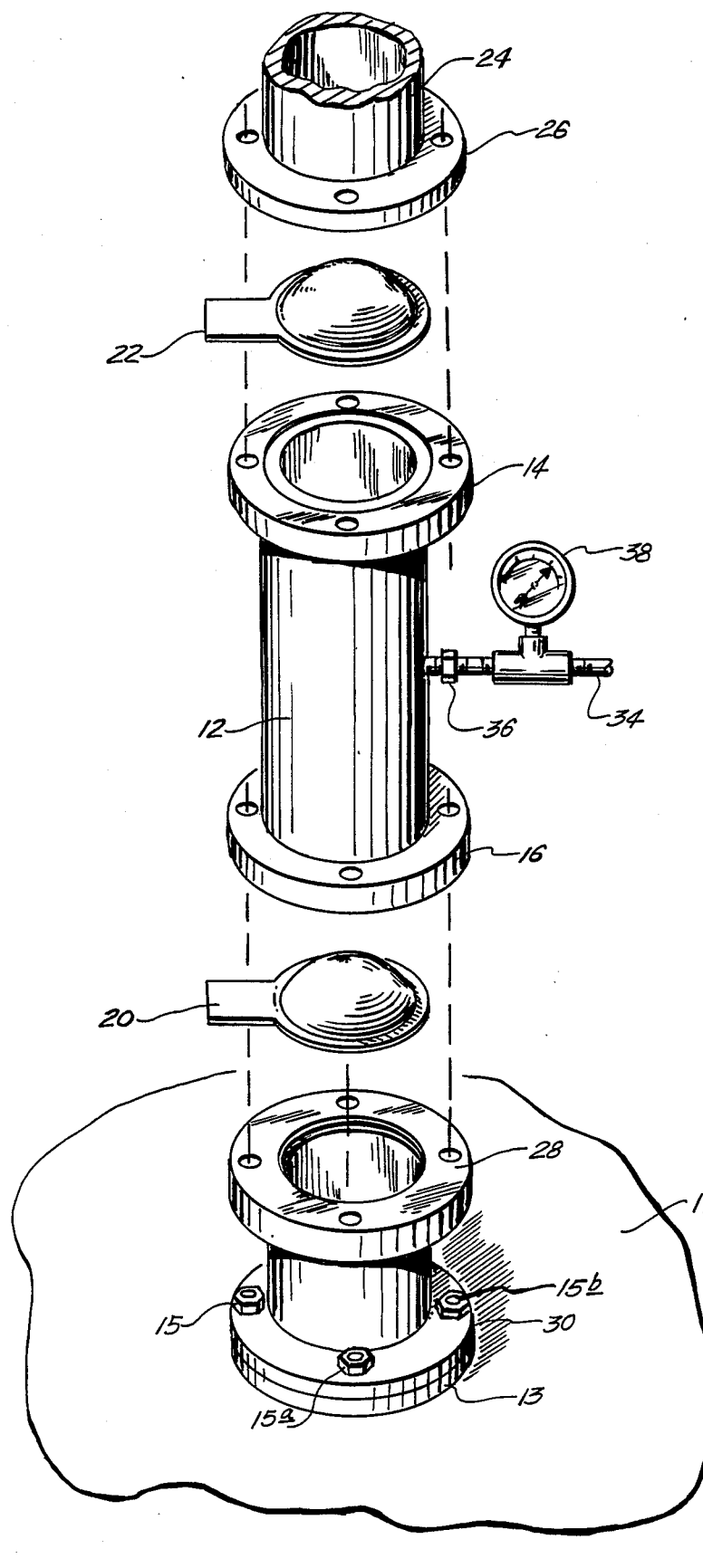
FIG. 2 is a partial, exploded view of the apparatus shown in FIG. 1.

Referring now to FIGS. 1 and 2, there can be seen an apparatus of this invention, generally designated by the numeral 10. Apparatus 10 comprises a cylindrical pipe 12 having flanges 14 and 16 at its ends. Cylindrical pipe 12 defines a chamber within its interior, which chamber is closed off at its lower end by main rupture disc 20. Main rupture disc 20 is mounted in a gas-tight relationship with the lower end of cylindrical pipe 12 by capture between flange 16 and flange 28. The gas tight capture is effected by use of conventional gasket material, not shown, and by obtaining a tight fit between flange 16, main rupture disc 20 and flange 28 by way of nut and bold combinations 18c, 18d and 18e and another nut and bolt combination, not shown, which is opposite nut and bolt combination 18d. In some cases the mounting of main rupture disc 20 may require the use of conventional disc holders which are not shown. Such disc holders are usually used with corrosion resistant composite discs.

Closing of the other of the ends of cylindrical pipe 12 is chamber rupture disc 22 which is mounted, in a gas-tight relationship, between flanges 14 and 26. This mounting is achieved by way of gasket material, not shown, and by means of nut and bold combinations 18, 18a, and 18b. Another nut and bolt combination, opposite that of 18a is used but is not shown in the drawings. A disc holder is usually not needed for chamber rupture disc 22 as this disc can be of the graphite type.

Pipe 25 has flange 28 at its upper end and flange 30 at its lower end. Pipe 25 is connected to vessel 11 at vessel flange 13 by way of nut and bolt combinations, 15, 15a, and 15b. Another nut and bolt combination opposite that of 15a is used but is not shown in the drawings. Pipe 25 is in gaseous communication with the interior of vessel 11. Thus, main rupture disc 20 is also in gaseous communication with the interior of vessel 11.

Flange 26 not only enables obtainment of a gas tight fit of chamber rupture disc 22 to the upper end of cylindrical pipe 12 but also carries a vent pipe 24 through which the gaseous contents of vessel 11 would be vented upon the rupture of both rupture discs. It is preferred that vent pipe 24 be straight and up standing so that, after vessel venting, any of the vessel contents remaining in vent pipe 24 will flow or fall, via gravity, back into the vessel. Vent pipe configurations in which the vessel contents remain in the vent pipe are not preferred.

As can be seen in FIG. 2, main rupture disc 20 and chamber rupture disc 22 have a domed configuration. This domed configuration is such that the convex surface of the dome faces upwardly towards vent pipe 24. This domed configuration is conventionally used for rupture discs, however, it is to be understood, that other configurations may be utilized for these rupture discs. When graphite rupture discs are used, they are usually not domed.

In FIG. 1 it can be seen that threaded fitting 36 is located approximately midway the length of cylindrical pipe 12. This fitting enables the threaded attachment of tube 34 thereto which provides gaseous communication between the interior of cylindrical pipe 12 and tube 34. Attached, in gaseous communication, to tube 34 is pressure switch 38 and pressure gauge 40 (FIG. 2). At the other end of tube 34 there is a nitrogen source 52 which can be a conventional nitrogen gas cylinder. Between pressure gauge 40 and along the gas route defined by tube 34 there are three valves, valve 42, valve 46, and valve 50. Between valve 46 and valve 50 is gas regulator 48. The regulator is preferably furnished with a downstream pressure tap and gauge and a downstream internal pressure relieving mechanism to prevent the error of overpressurizing the chamber. Between gas valve 42 and gas valve 46 is bleed tube 43, having at its lower end valve 44.

The pressure switch, pressure gauge, valve and regulator utilized are all of conventional structure and all serve conventional purposes.

In operation apparatus 10 is affixed to flange 28 so that main rupture disc 20 is in gaseous communication with the gas in vessel 11 and so that disc 20 seals off the lower end of cylindrical pipe 12. Valve 50 is open so that gas may flow to regulator 48. Regulator 48 is adjusted to deliver the desired pressure to be maintained within the interior of cylindrical pipe 12. Valve 42 and 46 are then opened so that the interior of cylindrical pipe 12 can be pressurized. After the desired pressure has been obtained, valve 42 is closed followed by the closing of valve 46. Valve 44 can then be opened to bleed that portion of tube 34 which is between valve 42 and valve 46. After bleeding has been accomplished valve 44 is left open. Valve 50 is also normally left open.

Should a gas leak develop in main rupture disc 20, the ga s ( which is within cylindrical pipe 12 and which has a higher pressure than that of the gas in vessel 11 will flow through the leak and into the vessel. This flow will continue so long as there is this pressure differential. Pressure switch 38 is set to activate upon the obtainment of a specified loss of pressure in the chamber provided by cylindrical pipe 12. Pressure gauge 40 will also show visually the loss in pressure. The activation of pressure switch 38 can be utilized for many purposes, e.g. to sound an alarm so that the presence of the leak in main rupture disc is known. Also, should a leak occur in chamber rupture disc 22 or should there be loss of the gas tight seal of the chamber, pressure gauge 40 and pressure switch 38 will detect same. Finally, if vessel pressure exceeds the set pressure, both discs will rupture and both pressure gauge 40 and pressure switch 38 will detect the loss in chamber pressure thereby providing an alarm, etc. that a rupture has occurred.

As can be appreciated the apparatus and process of this invention provide for the monitoring of main rupture disc 20 for the development of gas leaks therethrough. The monitoring arrangement shown in FIG. 1 provides both an alarm and a visual mode for determining the existence of such leaks. Also it is an important feature of this invention, that, under normal operating conditions and in the event of a small leak in main rupture disc 20, none of the gas within vessel 11 escapes into the atmosphere as the movement of gas is from the interior of cylindrical pipe 12 into vessel 11.

What is claimed is:

1. A process for detecting gas permeability in a main rupture disc which is in gaseous communication with a vessel, said process comprising:

(a) fitting a chamber over and in gas-tight association with said main rupture disc's outside surface;
(b) selecting
   (i) a burst pressure for the main rupture disc and,
   (ii) a set pressure;
(c) obtaining a gaseous pressure within said chamber which,
   (i) is greater than the normal operating pressure within said vessel, and
   (ii) is equal to the difference between said set pressure and the burst pressure of said main rupture disc; and
(d) monitoring said chamber pressure for a decrease thereof.

2. The process of claim 1 wherein said process additionally comprises providing said chamber with a chamber rupture disc having a burst pressure which, when added to the burst pressure of the main rupture disc, provides a sum which is substantially equal to the set pressure and which will allow for the obtainment of the chamber pressure without rupture of the chamber rupture disc.

3. The process of claim 1 wherein said gaseous pressure is provided by a gas source, which gas source is isolated from said gas chamber after the obtainment of said pressure in said chamber.

4. The process of claim 1 wherein said pressure in said vessel is above atmospheric.

5. An apparatus for detecting gas permeability in a main rupture disc which is in gaseous communication with a vessel, said apparatus comprising:
(a) a chamber which is fittable over and in a gas-tight manner with said main rupture disc's outside surface;
(b) means for obtaining, when said chamber is fitted as described in (a), a gaseous pressure within said chamber which,
   (i) is greater than the normal operating pressure within said vessel, and
   (ii) which is equal to the difference between a selected set pressure and a selected burst pressure for said main rupture disc; and
(c) means for monitoring said chamber pressure for a decrease thereof wherein said chamber is in gaseous communication with a chamber rupture disc which has a burst pressure which, when added to the burst pressure of said main rupture disc, provides a sum which is substantially equal to the set pressure and which will allow for the obtainment of said gaseous pressure in said chamber without rupture of the chamber rupture disc.

6. The apparatus of claim 5 wherein said chamber is a hollow cylinder which is closed at one of its ends by said main rupture disc when the fitment described in (a) is effected, and which is closed at the other of its ends by said chamber rupture disc.

7. The apparatus of claim 5 wherein said main rupture disc and said chamber rupture disc are visually different from one another.

8. The apparatus of claim 6 wherein said main rupture disc and said chamber rupture disc are visually different from one another.

9. The apparatus of claim 5 wherein said chamber rupture disc is not resistant to corrosive attack by the contents of said vessel but is resistant to corrosive attack by the gas in said chamber, and said main rupture disc is resistant to corrosive attack by the contents of said vessel and said gas in said chamber.

10. The apparatus of claim 6 wherein said chamber rupture disc is not resistant to corrosive attack by the contents of said vessel but is resistant to corrosive attack by the gas in said chamber, and said main rupture disc is resistant to corrosive attack by the contents of said vessel and said gas in said chamber.

* * * * *